United States Patent
Lee et al.

(10) Patent No.: US 8,059,159 B2
(45) Date of Patent: Nov. 15, 2011

(54) IMAGE CAPTURING DEVICE AND METHOD FOR ADJUSTING PHOTOGRAPHING ANGLE THEREOF

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 326 days.

(21) Appl. No.: 12/423,795

(22) Filed: Apr. 14, 2009

(65) Prior Publication Data

US 2010/0220205 A1 Sep. 2, 2010

(30) Foreign Application Priority Data

Mar. 2, 2009 (CN) .......................... 2009 1 0300633

(51) Int. Cl.
*H04N 5/228* (2006.01)
(52) U.S. Cl. .................................................. 348/208.7
(58) Field of Classification Search ............... 348/222.1, 348/211.99, 208.7
See application file for complete search history.

(56) References Cited

U.S. PATENT DOCUMENTS

| | | | |
|---|---|---|---|
| 2001/0007469 A1* | 7/2001 | Fuchimukai et al. ......... | 348/208 |
| 2005/0206736 A1* | 9/2005 | Ng et al. ..................... | 348/208.7 |
| 2005/0264668 A1* | 12/2005 | Miyamoto ............... | 348/333.11 |
| 2007/0223900 A1* | 9/2007 | Kobayashi et al. ............. | 396/50 |
| 2008/0055474 A1* | 3/2008 | Chen et al. ..................... | 348/580 |
| 2010/0207774 A1* | 8/2010 | Song ............................. | 340/669 |
| 2010/0208080 A1* | 8/2010 | Matsutani ..................... | 348/188 |

FOREIGN PATENT DOCUMENTS

CN 101163205 A 4/2008

* cited by examiner

*Primary Examiner* — Lin Ye
*Assistant Examiner* — Amy Hsu
(74) *Attorney, Agent, or Firm* — Altis Law Group, Inc.

(57) ABSTRACT

A image capturing device includes an image capture unit, a digital signal processor (DSP), a selection unit, an adjustment unit, a microprocessor, a storage unit, and a accelerometer. The image capture unit photographs a subject to output image data representing the subject to the DSP. The accelerometer detects an angle between a vertical axis of the image capture unit and the direction of the gravitational field to output an adjustment signal. The microprocessor outputs an adjustment value after comparing the adjustment signal with a reference adjustment value preset in the storage unit. When a first photograph angle adjustment manner is selected by the selection unit, the DSP adjusts the image data according to the adjustment value. When a second photograph angle adjustment manner is selected by the selection unit, the adjustment unit adjusts photographing angle of the image capture unit according to the adjustment value.

10 Claims, 4 Drawing Sheets

IMAGE CAPTURING DEVICE AND METHOD FOR ADJUSTING PHOTOGRAPHING ANGLE THEREOF

BACKGROUND

1. Technical Field

The present disclosure relates to image capturing devices, and particularly to an image capturing device and a method for adjusting a photographing angle of the image capturing device.

2. Description of the Related Art

Images captured by an image capturing device, such as a camera, may be skewed at an angle causing undesirable results. As a result, an operator of the camera may have to capture the images again or use digital photography software to amend the problem. However, these methods may be time-consuming and imprecise.

DETAILED DESCRIPTION

Figure 1:
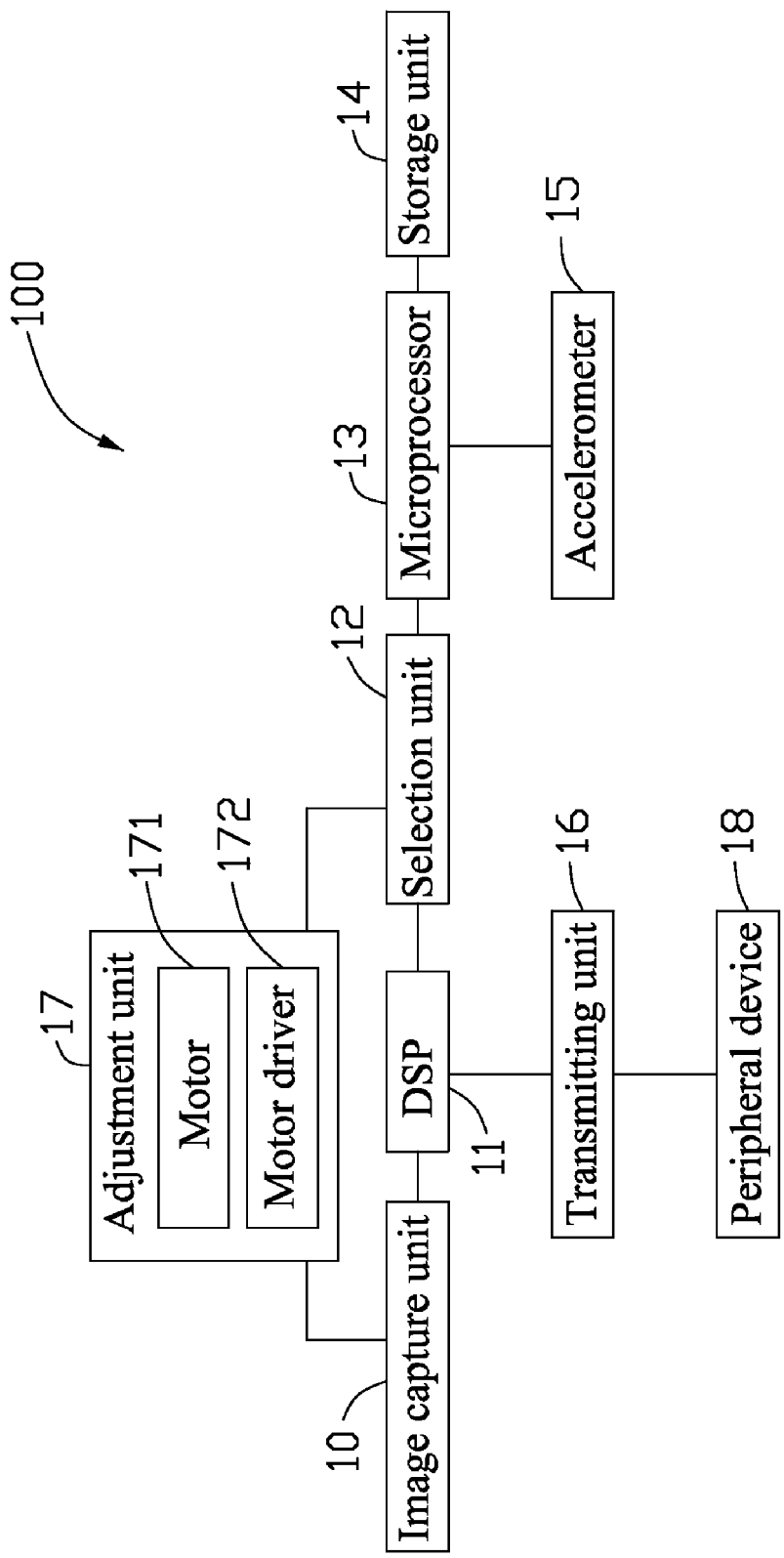
FIG. 1 is a block diagram of a first exemplary embodiment of an image capturing device.

Referring to FIG. 1, a first exemplary embodiment of an image capturing device 100 includes an image capture unit 10, a digital signal processor (DSP) 11, a selection unit 12, a microprocessor 13, a storage unit 14, an accelerometer 15, a transmitting unit 16, and an adjustment unit 17. The image capture unit 10 includes a plurality of photographing lenses and a charge coupled device (CCD). The adjustment unit 17 includes a motor 171 connected to the image capture unit 10, and a motor driver 172. The motor driver 172 drives the plurality of photographing lenses and the CCD to adjust a photographing angle of the image capture unit 10.

Figure 2:
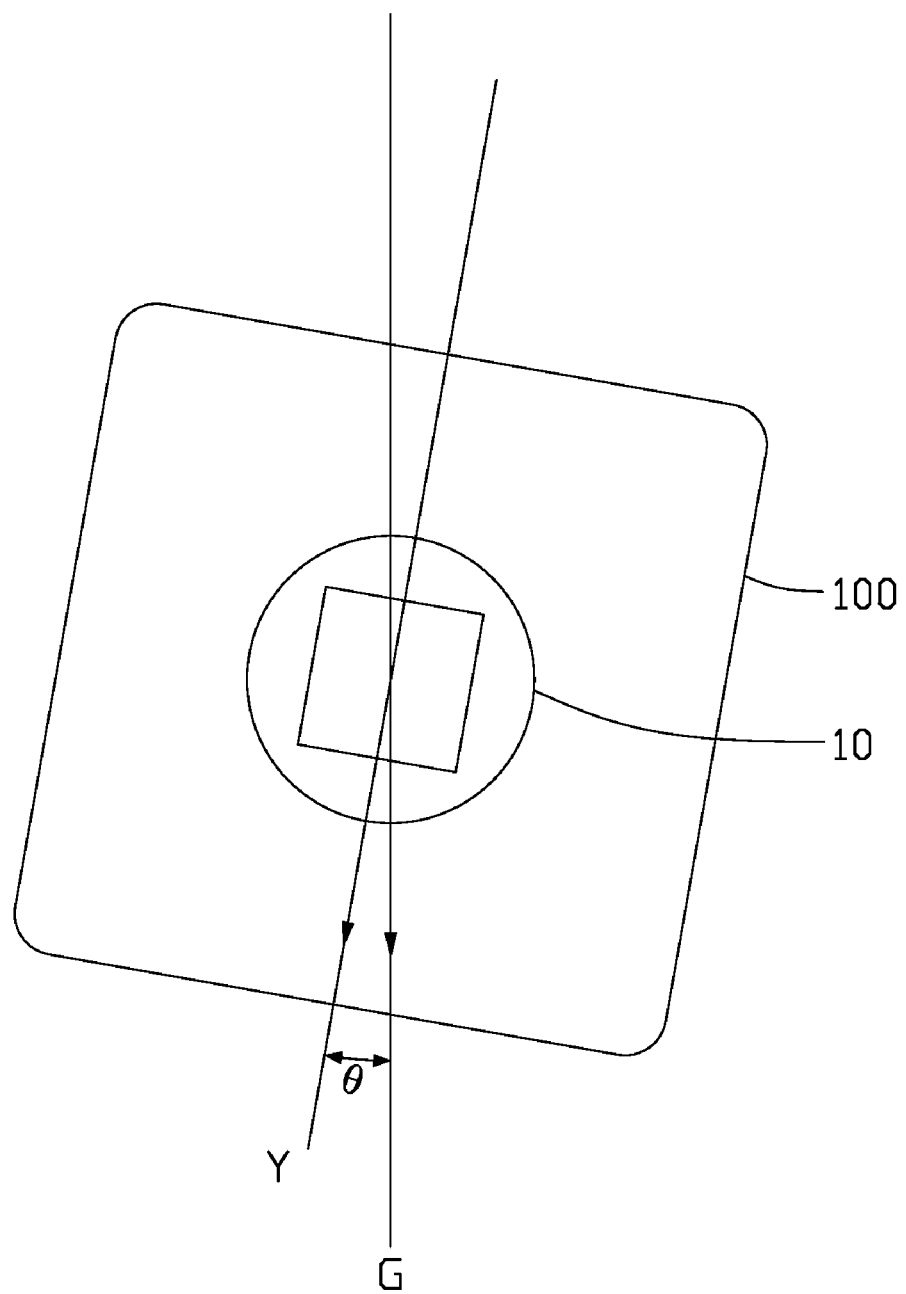
FIG. 2 is a schematic diagram of an angle between a vertical axis of the image capture unit in FIG. 1 and the direction of the gravitational field.

The image capture unit 10 is used for capturing images and outputting images in the form of data to the DSP 11. The accelerometer 15 is used for detecting an angle θ between a downward vertical axis Y of the image capture unit 10 and the direction G of the gravitational field, shown as FIG. 2, to output an adjustment signal α. It is understood that the accelerometer 15 can be also used for detecting an angle between a upward vertical axis of the image capture unit 10 and the direction G of the gravitational field to output the adjustment signal α. In one embodiment, the adjustment signal α can range from 0 degrees to 360 degrees. Accordingly, the adjustment signal α ranges from 0 degrees to 180 degrees when the downward vertical axis Y of the image capture unit 10 rotates clockwise relative to the direction G of the gravitational field, and the adjustment signal α ranges from 180 degrees to 360 degrees when the downward vertical axis Y of the image capture unit 10 rotates counter-clockwise relative to the direction G of the gravitational field. In other embodiments, the adjustment signal α can range from −180 degrees to 180 degrees. Accordingly, the adjustment signal α ranges from 0 degrees to 180 degrees when the downward vertical axis Y of the image capture unit 10 rotates clockwise relative to the direction G of the gravitational field, and from 0 degrees to −180 degrees when the downward vertical axis Y of the image capture unit 10 rotates counter-clockwise relative to the direction G of the gravitational field.

The storage unit 14 is used for storing a preset reference adjustment value, which is determined according to the adjustment signal α. When the adjustment signal α ranges from 0 degrees to 360 degrees, the preset reference adjustment value is 180 degrees. When the adjustment signal α ranges from −180 degrees to 180 degrees, the preset reference adjustment value is 0 degrees.

The microprocessor 13 is used for comparing the adjustment signal α with the preset reference adjustment value, to output a difference between the adjustment signal α and the preset reference adjustment value defined as an adjustment value. Therefore, a rotating direction of the downward vertical axis Y of the image capture unit 10 relative to the direction G of the gravitational field can be determined by the adjustment value. When the preset reference adjustment value is 180 degrees, a negative adjustment value can be used to indicate that the downward vertical axis Y of the image capture unit 10 rotates clockwise relative to the direction G of the gravitational field. Accordingly, a positive adjustment value indicates that the downward vertical axis Y of the image capture unit 10 rotates counter-clockwise relative to the direction G of the gravitational field. The microprocessor 13 is further used for determining if the image capturing device 100 is in an inclining attitude according to the adjustment value. For example, when the preset reference adjustment value is 180 degrees, the image capturing device 100 is not in an inclining attitude if the adjustment value is −180 degrees or 180 degrees. When the image capturing device 100 is in an inclining attitude, the adjustment signal is greater than 0 degrees, and is less than 360 degree, and the adjustment value is greater than −180 degrees, and is less than 180 degrees.

The selection unit 12 is used for selecting a first photographing angle adjustment manner to adjust the skewed image using digital signal processing techniques or a second photographing angle adjustment manner to adjust the skewed image using optical techniques. For the first photographing angle adjustment manner, the microprocessor 13 transmits the adjustment value to the DSP 11 by the selection unit 12. The DSP 11 adjusts the image data according to the adjustment value. For the second photographing angle adjustment manner, the microprocessor 13 transmits the adjustment value to the adjustment unit 17. The adjustment unit 17 adjusts the photographing angle of the image capture unit 10 according to the adjustment value. Moreover, the image data and the adjustment value can be transmitted by the transmitting unit 16 to a peripheral device 18, such as a computer. The image data can be adjusted by image process software in the peripheral device 18. In one embodiment, the selection unit 12 may be a switch circuit or a logic circuit.

Figure 3:
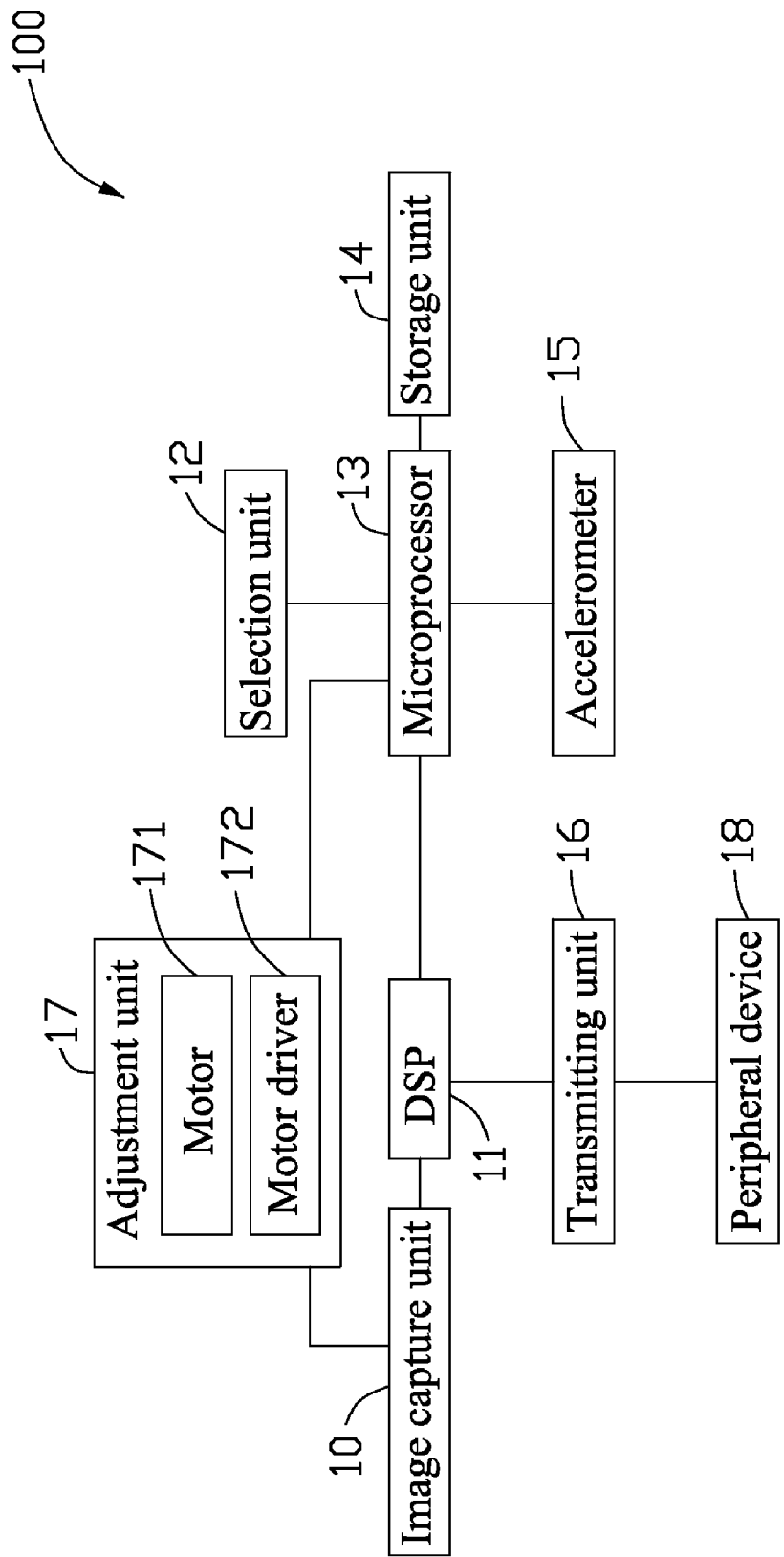
FIG. 3 is a block diagram of a second exemplary embodiment of an image capturing device.

Referring to FIG. 3, in a second exemplary embodiment of an image capturing device 100, the selection unit 12 is only electrically connected to the microprocessor 13, the DSP 11 is directly connected to the microprocessor 13, and the adjustment unit 17 is connected between the image capture unit 10 and the microprocessor 13. Other connections of the image capture unit 10, the DSP 11, the microprocessor 13, the storage unit 14, the accelerometer 15, the transmitting unit 16, and the adjustment unit 17 are the same as described in FIG. 1. In one example, the selection unit 12 may output a high level signal to control the microprocessor 13 to output the adjustment value to the DSP 11 to adjust the image data, while the selection unit 12 outputs a low level signal to control the microprocessor 13 to output the adjustment value to the adjustment unit 17 to adjust the photographing angle of the image capture unit 10. It may be understood that the adjustment value and the preset reference adjustment value can be other parameters depending on the embodiment.

Figure 4:
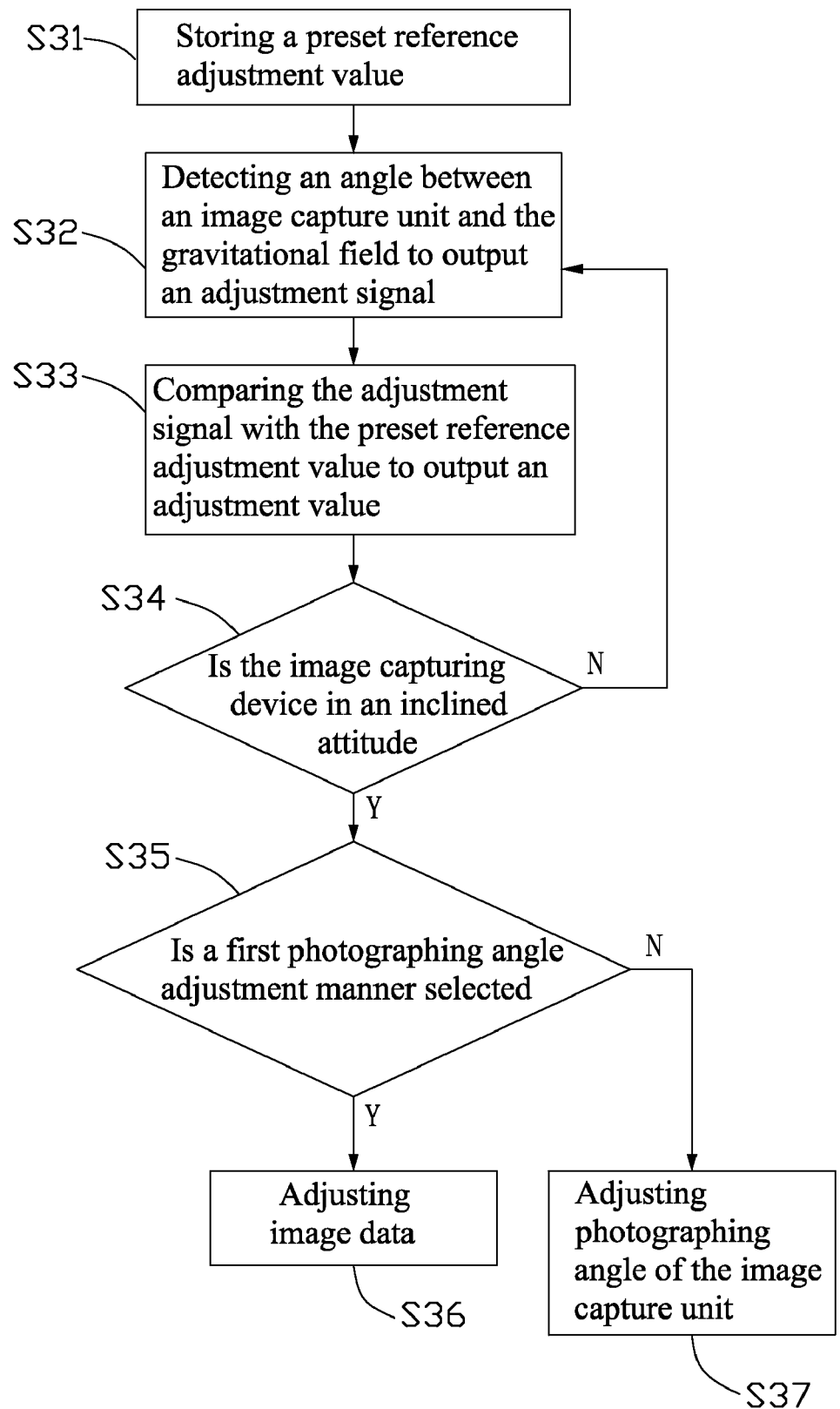
FIG. 4 is a flowchart of an exemplary embodiment of a method for adjusting a photographing angle of an image capturing device.

Referring to FIG. 4, an exemplary embodiment of an adjustment method for adjusting a photographing angle of the image capturing device 100 includes the following steps.

In step S31, a preset reference adjustment value is stored in the storage unit 14.

In step S32, the accelerometer 15 detects an angle between the downward vertical axis Y of the image capture unit 10 and the direction G of the gravitational field, to output an adjustment signal.

In step S33, the microprocessor 13 compares the adjustment signal with the preset reference adjustment value, to output an adjustment value.

In step S34, the microprocessor 13 determines if the image capturing device 100 is in an inclining attitude. If the image capturing device 100 is in an inclining attitude, the procedure goes to step S35. Otherwise if the image capturing device 100 is not in an inclining attitude, the procedure returns to step S32.

In step S35, the microprocessor 13 determines if the first photographing angle adjustment manner is selected. If the first photographing angle adjustment manner is selected, the procedure goes to step 36. If the second photographing angle adjustment manner is selected, the procedure goes to step 37.

In step S36, the microprocessor 13 transmits the adjustment value to the DSP 11, and the DSP 11 adjusts the image data according to the adjustment value.

In step S37, the microprocessor 13 transmits the adjustment value to the adjustment unit 17, and the adjustment unit 17 adjusts the photographing angle of the image capture unit 10 according to the adjustment value.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An image capturing device, comprising:
   a digital signal processor (DSP);
   a storage unit to store a preset reference adjustment value;
   an image capture unit configured to capture an image, and to output image data representing the image to the DSP;
   an accelerometer to detect an angle between a vertical axis of the image capture unit and the direction of the gravitational field, and to output an adjustment signal according to the angle;
   a microprocessor to compare the adjustment signal with the preset reference adjustment value, and to output an adjustment value according to the comparison;
   a selection unit to select one of a first photographing angle adjustment manner and a second photographing angle adjustment manner;
   an adjustment unit to adjust a photographing angle of the image capturing device; and
   wherein the DSP adjusts the image data according to the adjustment value in response to selecting the first photographing angle adjustment manner, and wherein the adjustment unit adjusts the photographing angle of the image capture unit according to the adjustment value in response to selecting the second photographing angle adjustment manner.

2. The image capturing device of claim 1, wherein the preset reference adjustment value is an angle determined according to the adjustment signal; wherein the preset reference adjustment value is 180 degrees in response to the adjustment signal being in the range from 0 degrees to 360 degrees, or wherein the reference adjustment angle is 0 degrees in response to the adjustment signal being in the range from −180 degrees to 180 degrees.

3. The image capturing device of claim 2, wherein the adjustment value is a difference between the adjustment signal and the preset reference adjustment value.

4. The image capturing device of claim 1, further comprising a transmitting unit, to transmit the adjustment value and the image data to a peripheral device.

5. The image capturing device of claim 1, the selection unit is a switch unit or a logic circuit.

6. The image capturing device of claim 1, wherein the adjustment unit comprises a motor connected to the image capture unit, and a driver for driving the image capture unit.

7. An adjustment method for adjusting a photographing angle for an image capturing device comprising a storage unit, an image capture unit, a digital signal processor (DSP), a microprocessor, a adjustment unit and an accelerometer, the adjustment method comprising:
   storing a preset reference adjustment value in the storage unit;
   detecting an angle between a vertical axis of the image capture unit and the direction of the gravitational field by the accelerometer to output an adjustment signal, and outputting image data representing an image captured by the image capture unit to the (DSP);
   comparing the adjustment signal with the preset reference adjustment value by the microprocessor to output an adjustment value according to the comparison;
   determining if the image capturing device is in an inclining attitude;
   if the image capturing device is in an inclining attitude, adjusting the image data by the DSP according to the adjustment value in response to selecting a first photographing angle adjustment manner; and
   if the image capturing device is in an inclining attitude, adjusting the photographing angle of the image capture unit by the adjustment unit according to the adjustment value in response to selecting a second photographing angle adjustment manner.

8. The adjustment method of claim 7, wherein the preset reference adjustment value is an angle determined according to the adjustment signal; wherein the preset reference adjustment value is 180 degrees in response to the adjustment signal being in the range from 0 degrees to 360 degrees, or wherein the preset reference adjustment angle is 0 degrees in response to the adjustment signal being in the range from −180 degrees to 180 degrees.

9. The adjustment method of claim 8, wherein the adjustment value is a difference between the adjustment signal and the preset reference adjustment value.

10. The adjustment method of claim 7, wherein the adjustment unit comprises a motor connected to the image capture unit, and a driver for driving the image capture unit.

* * * * *